(12) United States Patent  (10) Patent No.: US 8,690,210 B1
May  (45) Date of Patent: Apr. 8, 2014

(54) COMPUTER CASE SHELL WITH HANDGRIP

(76) Inventor: Brian May, Chattanooga, TN (US)

( * ) Notice: Subject to any disclaimer, the term of this patent is extended or adjusted under 35 U.S.C. 154(b) by 155 days.

(21) Appl. No.: 13/115,607

(22) Filed: May 25, 2011

Related U.S. Application Data (60) Provisional application No. 61/355,752, filed on Jun. 17, 2010.

(51) Int. Cl.
*B65G 7/12* (2006.01)
(52) U.S. Cl.
USPC .............................. 294/25; 224/217
(58) Field of Classification Search
USPC ......... 294/25, 137, 139, 219, 150; 455/575.8; 361/679.3, 679.55, 679.03, 679.56, 361/679.58; 224/217, 218, 930; 248/125.7, 248/682, 444, 450; 16/110.1, 111.1, 430
See application file for complete search history.

(56) References Cited

U.S. PATENT DOCUMENTS

| | | | |
|---|---|---|---|
| 6,360,928 B1 * | 3/2002 | Russo | 224/218 |
| 8,016,107 B2 * | 9/2011 | Emsky | 206/320 |
| 8,120,896 B2 * | 2/2012 | Mori et al. | 361/679.03 |
| 8,251,210 B2 * | 8/2012 | Schmidt et al. | 206/320 |
| 8,328,055 B1 * | 12/2012 | Snyder | 224/197 |
| 2004/0226973 A1 * | 11/2004 | Kao | 224/218 |
| 2010/0203931 A1 * | 8/2010 | Hynecek et al. | 455/575.8 |
| 2010/0327030 A1 * | 12/2010 | Yang | 224/199 |
| 2011/0174938 A1 * | 7/2011 | Calderon et al. | 248/125.7 |
| 2011/0267748 A1 * | 11/2011 | Lane et al. | 361/679.01 |
| 2011/0279959 A1 * | 11/2011 | Lopez | 361/679.03 |
| 2011/0303709 A1 * | 12/2011 | Wizikowski | 224/218 |
| 2012/0068043 A1 * | 3/2012 | Daigle et al. | 248/682 |
| 2012/0075799 A1 * | 3/2012 | Pollex | 361/679.56 |
| 2012/0118770 A1 * | 5/2012 | Valls et al. | 206/320 |
| 2012/0187706 A1 * | 7/2012 | Kannaka | 294/137 |

* cited by examiner

*Primary Examiner* — Saul Rodriguez
*Assistant Examiner* — Gabriela Puig
(74) *Attorney, Agent, or Firm* — Stephen J. Stark; Miller & Martin PLLC (57) ABSTRACT

A shell case for use with a pad style computer can have a rotating disc at its bottom. This disc can have a strap which connects to a user's hand to allow the user to rotate and/or hold the computer at a desired position with one hand, thereby allowing the other hand to do other things, such as type on the keypad. Meanwhile the holding hand does not quickly tire out as it is not typically grasping the computer as would often occur without the use of a case.

12 Claims, 6 Drawing Sheets

COMPUTER CASE SHELL WITH HANDGRIP

CLAIM OF PRIORITY

This application claims the benefit of U.S. Provisional Patent Application No. 61/355,752 filed Jun. 17, 2010, which is incorporated herein in its entirety by reference.

FIELD OF THE INVENTION

The present invention relates to a computer case for use with computers such as laptops or pad style computers which incorporate a handgrip whereby user can securely retain the case with one hand while possibly utilizing the user's other hand to operate the device such as to touch a touchscreen, move a mouse, type on a keyboard, etc.

BACKGROUND OF THE INVENTION

Cases exist for laptop computers. In fact, the new pad style computer trademarked the iPad™ from Apple Corporation is the subject of various cases which each can provide a cover which can protect the screen when not in use. Normally these cases are folio-style in nature and often made of leather or other similar folio materials. However, when the cover is pulled away to allow access for the user to access the pad, the potentially non-symmetric weight of the open flap makes it difficult for the user to hold on to the case and operate the pad style computer which is heavily dependent upon a touch screen. Accordingly, an improved computer case is believed to be desirable over prior art configurations.

SUMMARY OF THE INVENTION

The present invention relates to an improved case for use with computers.

It is an object of the present invention to provide an improved case for use with computers particularly pad style devices.

It is another object of many embodiments of the present invention to provide a hand retainer connected to a case for use with computers so that the user can one-handedly hold the computer preferably with many embodiments preferably not requiring the user to grip the hand retainer in a constantly contracted or gripped manner.

Accordingly, in accordance with a presently preferred embodiment of the present invention, a computer case is provided which preferably provides a hand retainer connected to a bottom side of the case. An upper side of the case opposite the handle preferably securely connects to a bottom of a computer such as a pad style computer. A user can place at least a portion of his or her hand through at least a first loop if not a first loop with a thumb through a second loop so that with the preferred hand retainer so, the user need not grip constantly the hand retainer to assist in keeping the case on the hand. The user can thus utilize the computer over a period of time without having a hand strain due to having to grip the computer.

In some embodiments, it is possible that the computer will be held in a non-symmetrically weighted configuration about the user's hand with the hand retainer installed. In some embodiments it may be possible to provide the hand retainer with the device symmetrically weighted about the user's hand.

Other embodiments may be directed towards a slide-on frame for use with an Ipad style computer to provide the appearance of a picture frame about the Ipad. The picture frame has a base to support the frame as well as an internal cavity for receiving the touch style computer.

Furthermore, at least two different versions of rotating handle supported cases are shown and described herein. Although the preferred embodiments have rotating capabilities, in other embodiments at least one if not both of these embodiments or others could be made so they do not rotate relative to the pad style computers.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
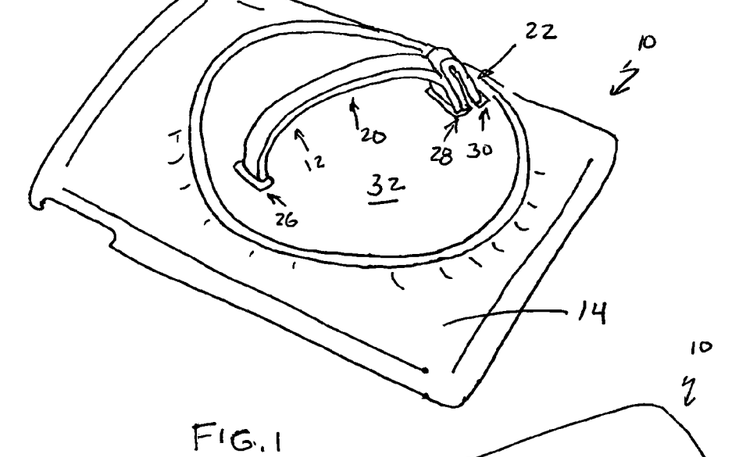
FIG. 1 is a back perspective view of a first preferred embodiment of the present invention.

FIG. 1 shows a case 10 of the presently preferred embodiment of the present invention. Specifically, a hand retainer 12 is illustrated connected to a bottom or back 14 of the case 10. The case has a shell or housing 16 preferably possibly coupled to a cover in some embodiments. In such embodiments the housing 16 can connect to a computer 94 and/or cover at a front and the shell 16 at a rear of the back 53 of the shell 16. A cover, if installed, can protect a screen and/or other portions computer 94 particularly in a pad style configuration.

Figure 2:
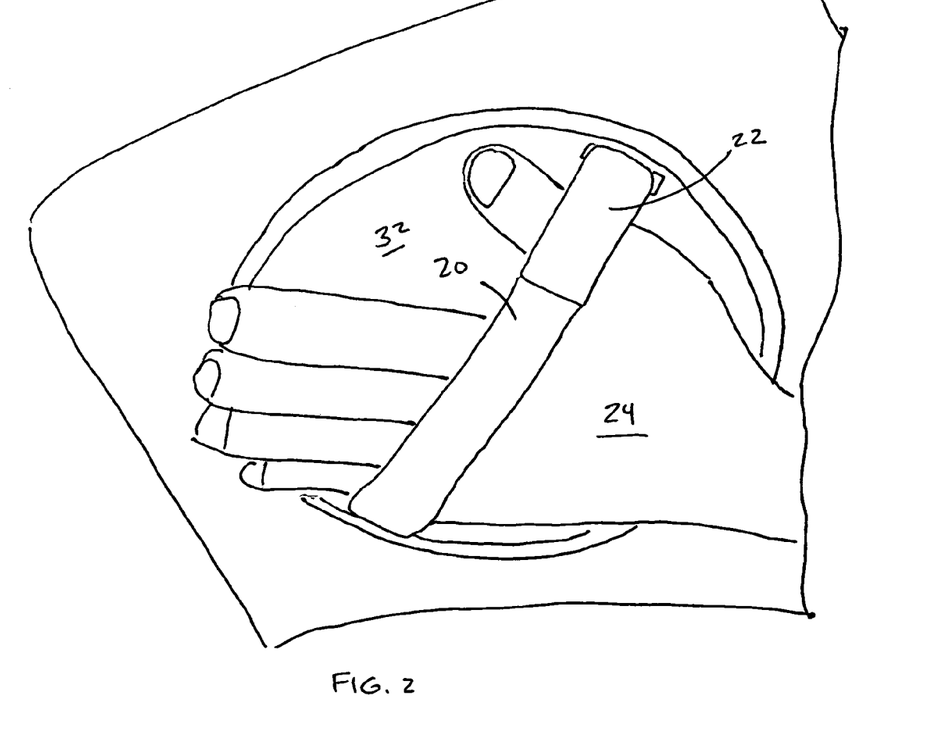
FIG. 2 is a back perspective view as shown in FIG. 1 with a user's hand connected thereto.
Figure 3:
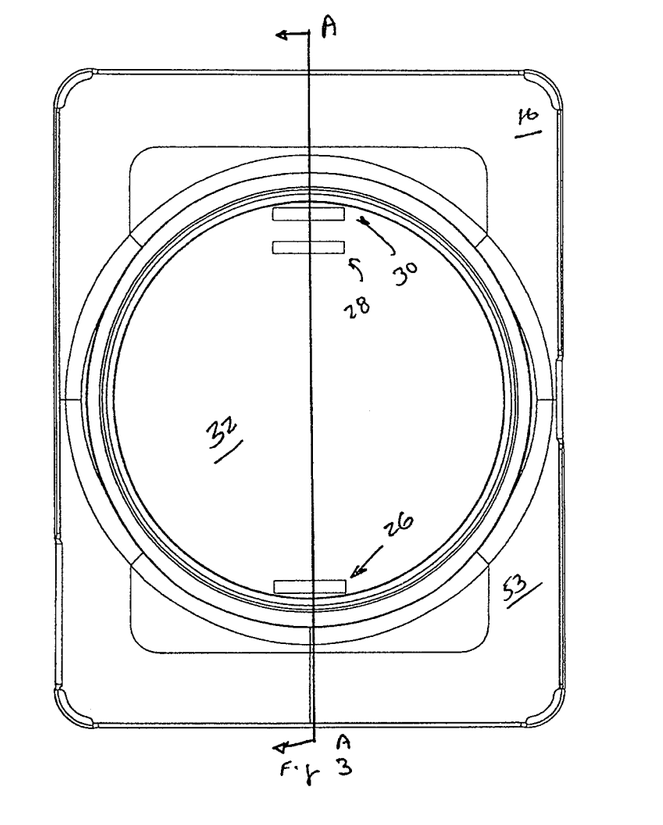
FIG. 3 is a back plan view of the embodiment shown in FIGS. 1 and 2 with the strap removed.

The hand retainer 12 of a first illustrated embodiment is in the form of a first or knuckle strap 20 and a second thumb strap 22 wherein the user inserts at least a portion of his or her hand 24 through the knuckle strap 20 and may place at least a portion of a thumb through the thumb strap 22, if provided. In this manner, the hand 24 need not be in a gripping configuration but can be positioned with the palm against the bottom 14 of the case 20 such as is illustrated in FIG. 2. Accordingly, the user's hand should not quickly tire from such a configuration since the user does not continually have to be gripping the computer 94, particularly an unbalanced one.

The knuckle strap 20 and/or thumb strap 22 can be made of any suitable material such as a fabric material or could possibly be resilient such as elastic or other material. The straps 20,22 could lay flat when not in use in some embodiments. The bottom 14 may be a fabric or could be any other suitable material such as leather, plastic, metal or other suitable material as could be the cover. The hand retainer 12 is shown disposed substantially the middle of the bottom 14, but could be provided elsewhere for other embodiments. Thus having the hand retainer 12 is a particularly attractive option so as to be able to hold the case 10 with the computer 94 attached thereto and/or other support thereof without having to continuously strain the muscles in the hand by gripping the side of the computer 94 or other structure.

The straps 20,22 may not be utilized in all embodiments and either one or both could be utilized in some embodiments. Straps 20,22 are shown passing through first, second and third passages 26,28,30 through disk 32. Passages 26,28,30 need not necessarily penetrate disk 32 is all embodiments. Disk 32 can receive the palm of a hand 24 such as is shown in FIG. 2. In this embodiment, disk 32 may be rotated relative to housing 16 as will be described in further detail below.

Disk 32 may be centrally located relative to the housing 16 or otherwise provided. Disk 32 may have a lip 34 which is received in a slot 36 of the housing 16 thereby facilitating rotation. As can be seen from FIG. 4, the passages 28,30 as well as 26 (obscured from view) may pass through the disk to allow the straps 20,22 to pass through to allow for adjustability. One who is skilled in the art would understand the straps could be adjustable as shown in the figures. The illustrated straps 20,22 are hook and loop fasteners which may provide for adjustability as understood by those of ordinary skill in the art.

Figure 4:
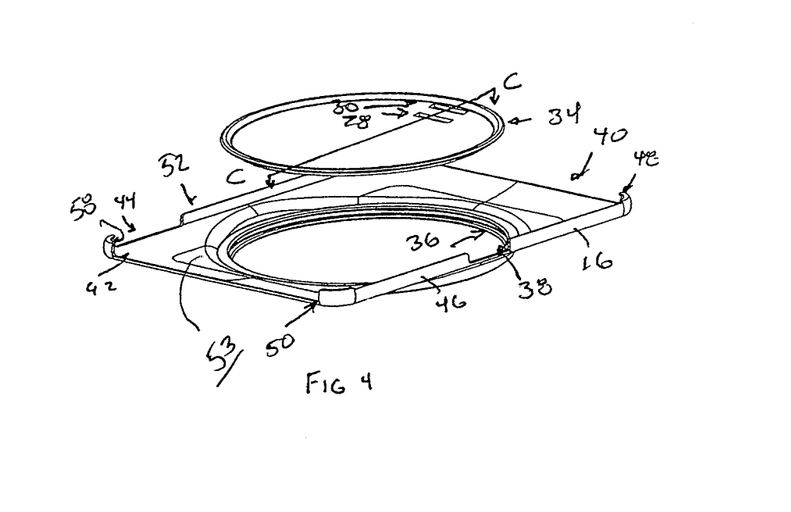
FIG. 4 is a top exploded view of the embodiment shown in FIGS. 1-3.

As can be seen in FIG. 4, the shell housing 16 may provide a plurality of cutouts such as first cutout 38, second cutout 40, third cutout 42, fourth cutout 44. These cutouts 38,40,42,44 in the various upwardly extending sides such as sides 46,48,50, 52 may allow for the accessing of various connections and/or other components of the pad style computer such as volume control, speakers, power connections, data connections, etc. Cutouts 38,40,42,44 may be desired in other portions of the housing 16 such as in the bottom 14 if desirable. Other pad style computers may prefer connections or access on the back of those style computers. Sides 46,48,50,52 are shown upwardly extend such as substantially perpendicularly relative to back 53.

Figure 5:
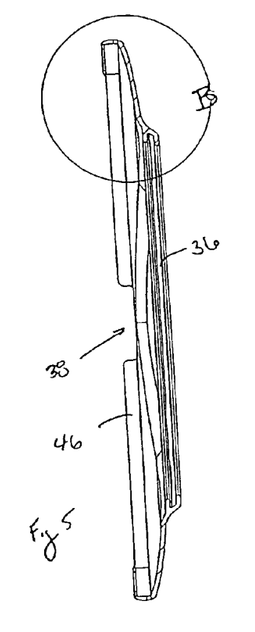
FIG. 5 is a cross-sectional view taken along the line A-A of FIG. 3 with the rotating disc removed.
Figure 6:
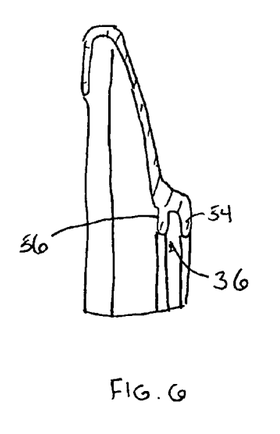
FIG. 6 is a detailed view of detail B shown in FIG. 5.

FIG. 5 may be useful to show the first cutout 38 in the side 46 as well as provide a cross section of the disc slot 36 which is shown as a circumferential slot bounded by extensions 54,56 as may be better understood with reference to FIG. 6. FIG. 4 also shows overhang 58 which may be located at one or even at each of the corners of the housing 16 which is useful to retain the pad style computer to the housing 16. Overhanger(s) 58 may extend over top portions of computer 94 when installed and may be located at various portion(s) of side(s) 46,48,50,52 in various embodiments. The overhang(s) 58 continually extends inwardly relative to the side(s) 46,48,50, 52. The overhanger(s) 58 at least assist in retaining computer 94 between the overhang(s) 58 and the back 53 of the housing 16 when the computer 94 is installed. The back 53 and sides 48,50,52,54 are preferably at least substantially rigid. Overhang(s) 58 may be rigidly and/or integrally connected to side(s) 48,50,52,54 and/or back 53.

Figure 7:
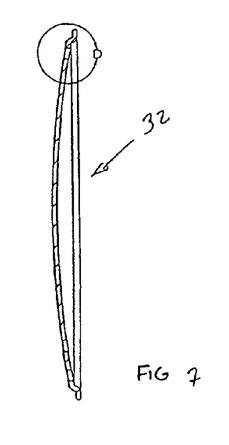
FIG. 7 is a cross-sectional view taken along the line C-C of FIG. 4.
Figure 8:
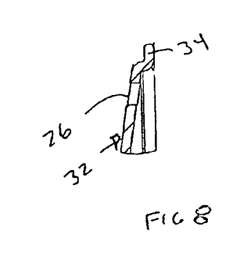
FIG. 8 is a detailed view of Detail D shown in FIG. 7.
Figure 19:
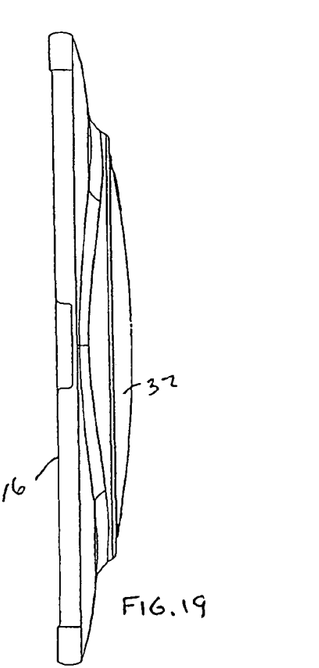
FIG. 19 is a side plan view of the embodiment of FIGS. 1-8 and 18.

A cross section of the disk 32 shown in FIG. 7 with detail D being shown in FIG. 8 for FIG. 7. Detail D shows the lip 34 extending relative to the disk 32 circumferentially to engage the disc slot 36 thereby providing retention yet rotation of the disk 32 relative to the housing 16 as would be understood by those of ordinary skill in the art. The first slot 26 is also shown in the disk 32 for receipt of the retainer 12 as described above. In use, the operator can put a hand 24 through the retainer 12 as described above such as by inserting it into the knuckle strap 20 and/or thumb strap 22 with the computer 94 connected to the housing 16 such as shown in FIG. 19.

The disk 32 is shown extending a distance beyond a first extension 54 which in some embodiments is the bottom most portion of the housing 16. The disk 32 may have a concave surface both internally and externally which may cooperate with the curved back of a pad style computer since the Ipad® and/or provide a more comfortable location for the palm of a hand or other side portion of a hand and fingers to contact. Disk 32 is preferably round but can take other shapes in other embodiments as long as the rotating feature was similarly addressed.

Figure 9:
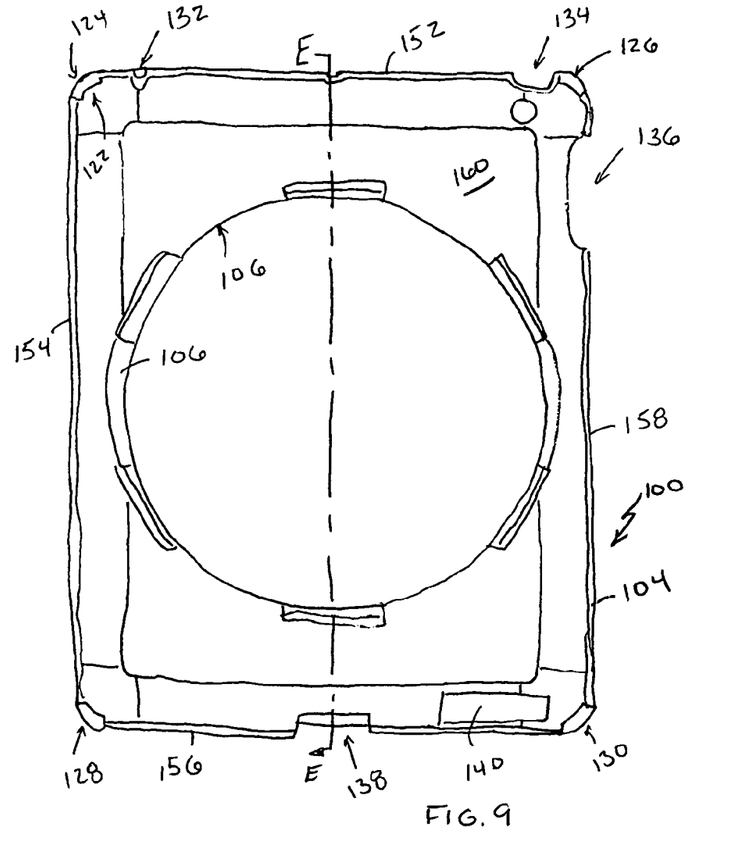
FIG. 9 is a top plan view of a first alternatively preferred embodiment of the present invention with the disc removed.

FIG. 9 shows a first alternatively preferred embodiment of the present invention. In this embodiment, a shell case 100 is shown from a top plan view with the disc portion 102 removed. This case 100 is preferably made out of plastic material, but other materials could be utilized with other embodiments. The shell 104 may have components that are at least somewhat resilient and/or movable to facilitate the insertion of the disc 102 as will be discussed below.

Arms 106 are spaced apart and contact an upper portion of the disc 102 when installed, while a bottom portion of the disc around its periphery 108 contacts the lower lip 110. This construction allows the disc 102 to rotate in the slot 112 created between the arms and the lip 110 for rotational embodiments.

Disc 102 is shown as having planar bottom 114 in this embodiment, and could be acid etched or have other finishes. Other discs 102 can be curved, or have other shapes, such as for the first embodiment described above and others. Periphery 108 may be recessed relative to disc center 116 in at least some embodiments. Grid 118 can be useful to provide support to the disc 102 for at least some embodiments, and is illustrated as an integrally molded portion thereof, although other embodiments could take on other configurations.

Lower lip 110 is shown downwardly extending relative to bottom 120 to spaced the disc 102 below the back of a computer, when installed as will be discussed below. Other embodiments may have other constructions.

Figure 10:
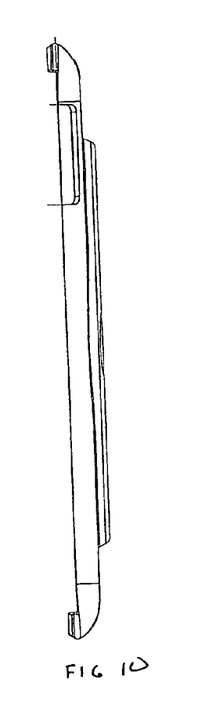
FIG. 10 is a side plan view of the embodiment shown in FIG. 9.
Figure 11:
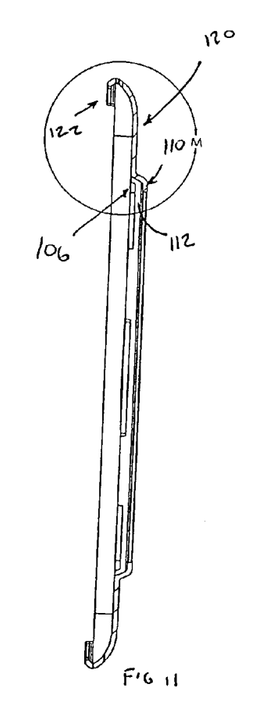
FIG. 11 is a cross sectional view of the embodiment shown in FIGS. 9 and 10 taken along the line E-E.
Figure 12:
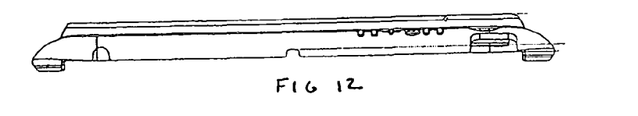
FIG. 12 is a bottom plan view of the disc used with the embodiment shown in FIGS. 9 and 10.
Figure 13:
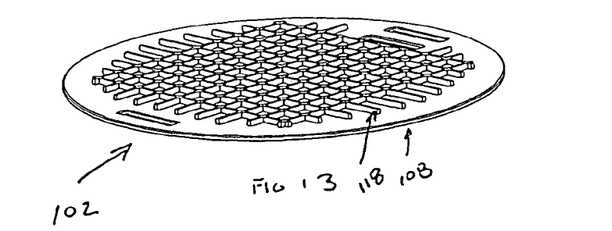
FIG. 13 is a top plan view of the embodiment shown in FIGS. 9-12.
Figure 14:
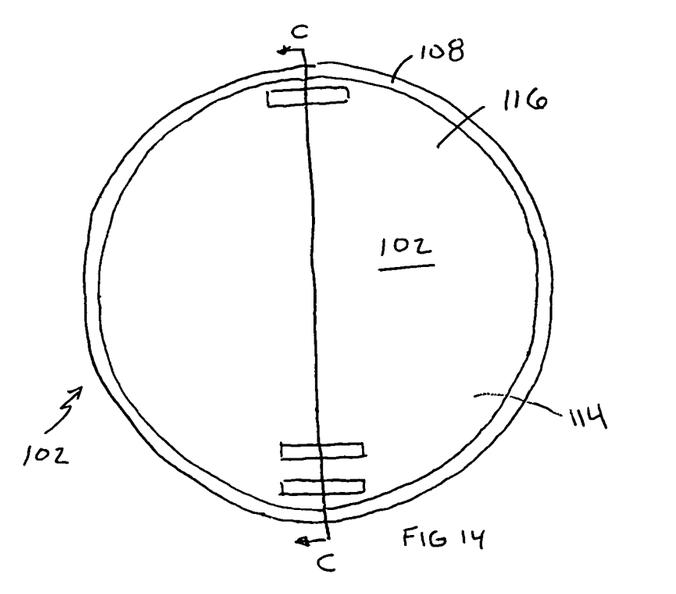
FIG. 14 is a bottom plan view of the embodiment shown in FIG. 13.

Overhangs 122 are shown in FIG. 10-12 and are spaced apart. In the first embodiment, the overhangs appear to have longer constructions and extend substantially over a front face of the computer when installed. In the embodiment of FIGS. 10-12, the overhangs are relatively small and are located at corners 124,126,128,130, although other embodiments could have them located in additional and/or different locations. Overhangs cooperate with corners of the computer, when installed, to retain the case 100 to the computer as will be discussed below.

Cutouts 132,134,136,138,140 allow for access of cords into ports in the computer when installed, speakers, microphones, chargers, communication devices, buttons, switches, and or other functional capabilities.

Figure 15:
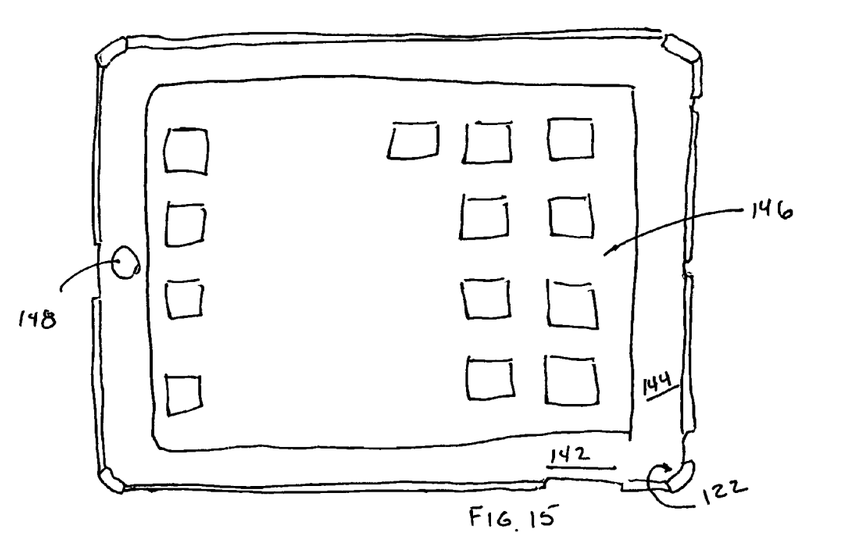
FIG. 15 is a front plan view of the embodiment of FIG. 9 with a computer installed.

FIG. 15 shows the overhangs 122 over a front side 142 of computer 144 which at least assist, if not completely, retain the case 10 to the computer 144. The screen 146 is preferably completely visible as is the operational button 148 on at least one manufacturer's computer 144.

Figure 16:
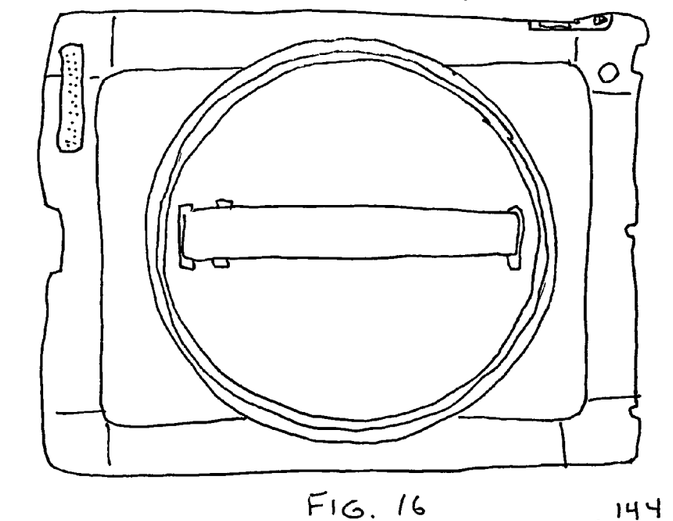
FIG. 16 is a back plan view of the embodiment of FIG. 15.
Figure 17:
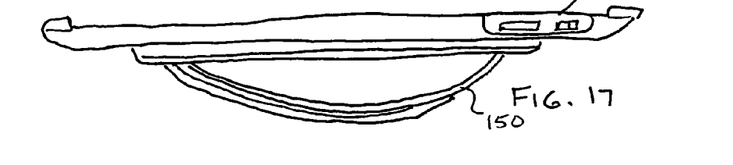
FIG. 17 is a side plan view of the embodiment of FIG. 15.
Figure 18:
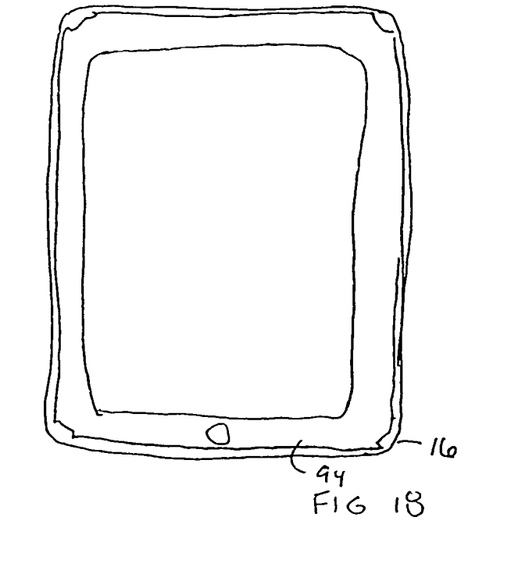
FIG. 18 is a front plan view of the embodiment of FIG. 1.

FIG. 17 shows buttons or communication ports on the computer 144 which are accessible through cutout 136. FIG. 16 also shows access through the cutout 136 as well as to speaker or microphone through cutout 140 and other ports or access locations with computer 144. Disc 102 is shown connected to shell 104. Band 150 is shown connected to the disc 102. Hook and loop fasteners are shown connecting band 150 to itself for adjustability, but other mechanisms could be utilized in other embodiments.

Overhangs 122 can extend from one or more sides 152,154,156,158. The illustrated overhangs extend out cantileveredly from the sides 152,154,156,158 and at least substantially perpendicularly thereto. Sides can curve or otherwise be perpendicular to back 160 of shell 104. Overhangs 122 and back 160 are shown as being somewhat, if not actually, parallel.

By providing a plastic case 100, the case 100 has been found to be sufficiently rugged as well as relatively light weight. Other embodiments could utilize different materials for different purposes.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A shell case for use with a pad style computer comprising:
   a shell having a back and upwardly rigidly extending sides defining a perimeter from the back;
   at least one overhang extending from at least one of the sides, said overhang configured to at least assist in retaining a pad style computer between the overhang and the back when the computer is installed in the case; and
   a hand retainer connected to a rear of the back, said hand retainer configured to at least assist in retaining a portion of a user's hand to the case when in use and is located in its entirety intermediate the perimeter defined by the sides;
   wherein a perimeter of the user's hand when retained in the hand retainer is smaller than and retained within a perimeter of the pad style configuration when it's being held; further comprising a convex disc at the back of the case supporting the hand retainer with the hand retainer connected to the disc and spanning a portion of the disc at the rear of the back; and wherein the disc is operably coupled to the shell and is rotatable relative thereto with the disc having a perimeter lip received in a slot in the shell to provide for rotation.

2. The case of claim 1 further comprising at least one cutout in at least one of the sides providing access through the shell to at least a portion of the computer when installed.

3. The case of claim 2 further comprising at least two cutouts through the shell.

4. The case of claim 2 wherein the at least one overhang further comprises at least two overhangs at corners of the shell.

5. The case of claim 1 wherein the at least one overhang extends cantileveredly and inwardly relative to the at least one side.

6. The case of claim 1 wherein the back is rigid.

7. The case of claim 6 wherein the back and sides are integrally connected.

8. The case of claim 1 wherein the sides and at least one overhang are integrally and rigidly connected.

9. A shell case for use with a pad style computer comprising:
   a shell having a rigid back and upwardly extending rigid sides at a perimeter connected to the back;
   at least one overhang extending from at least one of the sides, said overhang configured to at least assist in retaining a computer between the overhang and the back when the computer is installed in the case;
   a hand retainer connected to a rear of the back, said hand retainer located completely within the perimeter and configured to at least assist in retaining a portion of a user's hand with a palm against the rear of the case with a perimeter of hand-hold completely within the perimeter of the shell when in use.

10. The case of claim 9 wherein the at least one overhang is integrally connected to the at least one side; and further comprising a groove in back, a cutout in the end, a disc having a perimeter lip connected to and rotatable relative to the groove in the back.

11. The case of claim 9 further comprising a plurality of cutouts in at least one of the sides and back providing access to portions of the computer when installed.

12. The case of claim 9 wherein the hand retainer further comprises a band, and said band is connected to the disc.

\* \* \* \* \*

UNITED STATES PATENT AND TRADEMARK OFFICE
CERTIFICATE OF CORRECTION

| | |
|---|---|
| PATENT NO. | : 8,690,210 B1 |
| APPLICATION NO. | : 13/115607 |
| DATED | : April 8, 2014 |
| INVENTOR(S) | : Brian May |

It is certified that error appears in the above-identified patent and that said Letters Patent is hereby corrected as shown below:

In the Claims

Column 6, line 37, Claim 9, before "." add -- ; and further comprising a groove in back, a cutout in the end, a disc having a perimeter lip connected to and rotatable relative to the groove in the back. --

Column 6, line 39, Claim 10, after "side" remove "; and further comprising a groove in back, a cutout in the end, a disc having a perimeter lip connected to and rotatable relative to the groove in the back."

Signed and Sealed this
Twenty-fourth Day of May, 2016

Michelle K. Lee
*Director of the United States Patent and Trademark Office*